United States Patent [19]

Huggins et al.

[11] Patent Number: 5,363,715
[45] Date of Patent: Nov. 15, 1994

[54] TRANSMISSION X-CONTROL MECHANISM AND PIVOT PIN THEREFORE

[75] Inventors: Michael J. Huggins; William R. Chene, both of Kalamazoo, Mich.

[73] Assignee: Eaton Corporation, Cleveland, Ohio

[21] Appl. No.: 82,571

[22] Filed: Jun. 28, 1993

[51] Int. Cl.⁵ ............................................. F16H 59/10
[52] U.S. Cl. .................................. 74/473 R; 403/155
[58] Field of Search .................... 74/473 R, 476, 477; 403/155

[56] References Cited

U.S. PATENT DOCUMENTS

| | | | |
|---|---|---|---|
| 2,017,101 | 10/1935 | Lapsley | 74/473 R |
| 2,310,310 | 2/1943 | Peterson et al. | 74/473 R X |
| 3,310,992 | 3/1967 | Stott | 74/473 R |
| 4,222,281 | 9/1980 | Mylenek | 74/473 R X |
| 4,621,537 | 11/1986 | Piazza et al. | 74/477 |
| 4,633,728 | 1/1987 | May | 74/476 |
| 4,757,726 | 7/1988 | Yamaguchi et al. | 74/473 R |
| 5,179,869 | 1/1993 | Reynolds | 74/473 R |

FOREIGN PATENT DOCUMENTS 1288840  9/1972  United Kingdom ............. 403/155

Primary Examiner—Allan D. Herrmann
Attorney, Agent, or Firm—Albert E. Chrow

[57] ABSTRACT

An X-control mechanism (200) using an improved and easily installed pivot pin (100) is provided for providing a cylindrical pivot surface (16) about which a pivot arm (8) is able to pivot in response to movement of a control block (6) that is selectively engageable by a primary shaft (3) movable by an operator. The pivoting of arm (8) is operative to slide an x control yoke (14) in an opposite direction along a fixedly secured control shaft (22) for selectively engaging mainshaft gears to a transmission mainshaft 32. Pivot pin (100) is operative to hold pivot arm (8) against the transmission housing (10) between an enlarged head (12) at one end and a snap ring (20) extending radially outwardly from an annular groove (18) adjacent the opposite end.

3 Claims, 1 Drawing Sheet

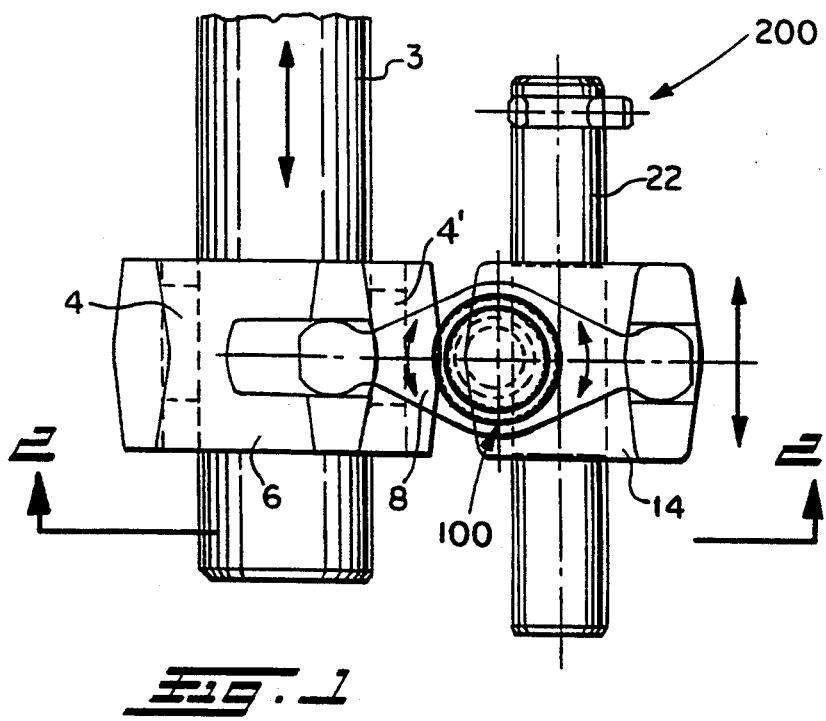
_FIG. 1_
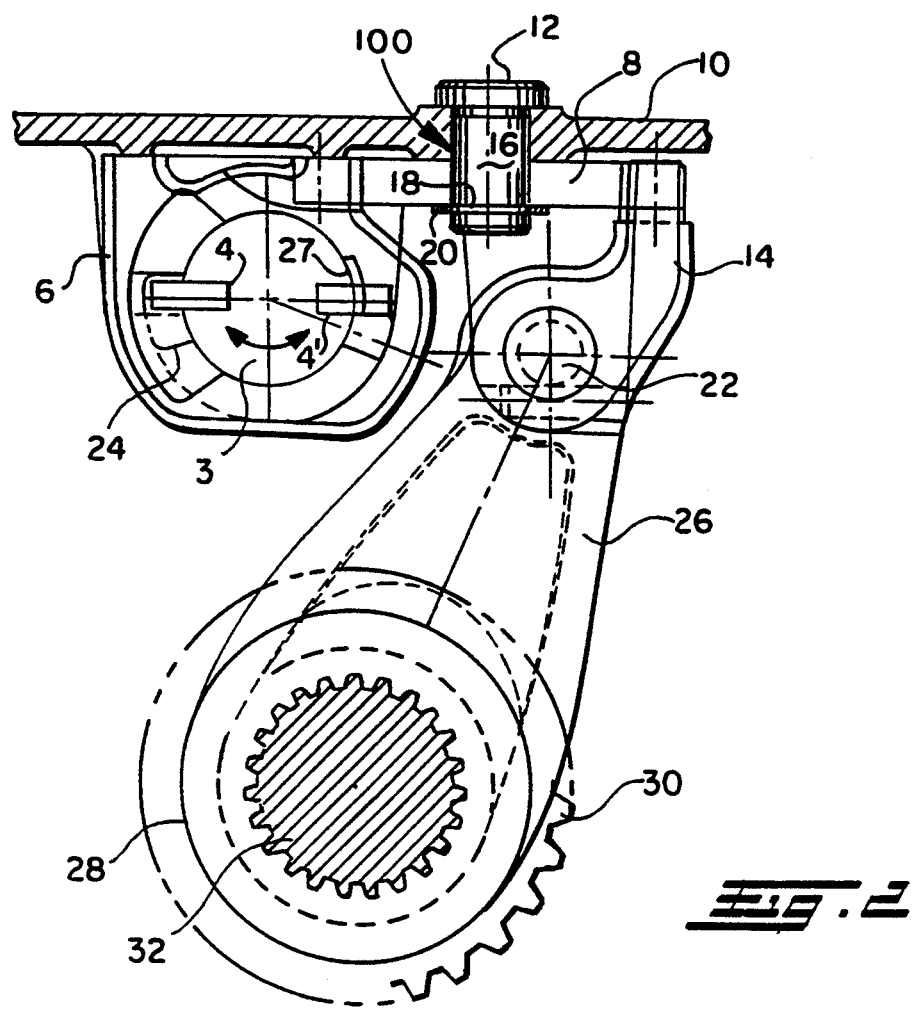
_FIG. 2_

TRANSMISSION X-CONTROL MECHANISM AND PIVOT PIN THEREFORE

INTRODUCTION

This invention relates generally to an X-control system for a change gear transmission and more particularly to a change gear transmission X-control system that utilizes an improved pivot pin for mounting a pivotable actuator arm of the mechanism to the transmission housing.

BACKGROUND OF THE INVENTION

Certain change gear transmissions have utilized X-control mechanisms for a number of years. In change gear transmission art, an X-control mechanism is a mechanism that reverses the direction of linear motion of a pair of spaced-apart members by means of a pivotable arm pivotably mounted therebetween such that when one of the members moves in one direction to engage the pivotable arm on one side of the pivot point, the arm on the opposite side of the pivot point pivots and engages the other member and moves it in opposite direction of movement of the first member. Such is of particular advantage in application to gear shaft patterns for it enables, one for example, to move a gear shift arm to a selected location in the shifting pattern which then, by means of the pivot arm, causes a clutching mechanism to move in an opposite direction to clutchingly engage a mainshaft gear to the transmissions mainshaft to provide a desired gear change ratio.

Such X-control mechanisms are costly and complex and have heretofore employed a bolt having a threaded end and substantially cylindrical pivot surface along its shank about which the pivot arm pivots once mounted on the transmission housing.

Generally, the bolt has been inserted through aligned openings through the pivot arm and transmission housing from inside the transmission housing such that the enlarged head of the bolt rests against the pivot arm inside the transmission housing with the threaded end of the bolt exposed in the outside of the transmission housing and onto which is threaded a nut washer combination for securing the bolt to the housing. The pivot surface has a larger diameter than the threaded end to provide an annular shoulder on the bolt facing towards the threaded end that engages the inside of the housing when the bolt shank is inserted through the opening through the pivot arm.

The problems with the use of a nut/bolt combination is that, unless the nut is wired or otherwise secured, there is no assurance that the nut will not loosen over a period of time in addition to the assembly of the parts itself being difficult in having to hold the bolt steady while tightening the nut.

The present invention eliminates the use of such prior art bolt and nut combination for mounting the pivotable arm of the X-control mechanism to the transmission housing by eliminating both the nut and the threads and replacing them with a pivot pin having an enlarged head and a transverse annular groove in the outer surface at the exposed end of the shank that is positioned such that a retaining ring such as a snap ring can be inserted into the groove and hold the pivot arm against the transmission housing without inhibiting its ability to pivot.

SUMMARY OF THE INVENTION

Accordingly, it is an object of this invention to provide an improved pivot pin for mounting a pivotable arm of an X-control mechanism to a change gear transmission housing.

It is another object of this invention to provide a change gear transmission X-control mechanism utilizing an improved pivot pin for mounting a pivotable arm of the mechanism to the transmission housing.

It is still a further object of this invention to provide an improved pivot pin for mounting a pivotable arm of an X-control mechanism to a change gear transmission housing that is effective, low cost, and simple to insert in that rotation of one member relative another member is not required in order to effect the mounting.

BRIEF DESCRIPTION OF THE DRAWINGS

FIG. 1 is a top plan view of a X-control mechanism 200 using pivot pin 100 of the invention; and FIG. 2 is a side elevation view of mechanism 200 of FIG. 1 taken along view line 2—2.

DESCRIPTION OF SOME PREFERRED EMBODIMENTS

X-control mechanism 200 of FIG. 1, comprises a primary shaft 3 that is in spaced-apart parallel relationship with control shaft 22. As shown in FIGS. 1 and 2, primary shaft 3 is both rotatable and movable by an operator in opposite directions along it longitudinal axis.

The movement of shaft 3 is undertaken by the operator as part of a selectable shifting sequence of a change gear transmission.

Shaft 3 carries a pair of keys or protuberances 4 and 4' that extend radially outwardly therefrom and are operative to engage internal circumferentially extending slots 27 and 24 respectively disposed in inner peripheral surface 5 of an opening in X-control block 6 through which shaft 3 is received upon being rotated by the operator within the opening FIGS. 1 and 2.

Control block 6 is thus selectively engageable by the operator by rotating shaft 3 within the opening in block 6 so that keys 4 and 4' can engage the internal slots 27 and 24 respectively as previously described. Once engaged with the slots in block 6, block 6 can then be moved in opposite axial directions upon longitudinal (axial) movement of shaft 3 in the corresponding axial direction.

Block 6 is connected to one end of a pivot arm referenced by numeral 8 that is held pivotably against the inside of transmission housing 10 by the pivot pin of the invention referenced by numeral 100 extending through aligned openings 7 and 9 disposed in housing 10 and pivot arm 8 respectively.

Pivot pin 100 has replaced a threaded bolt and nut priorly used to mount such pivot arms.

The opposite end of pivot arm 8 on the opposite side of pivot pin 100 is connected to any control yoke 14 that is slidably movable along any control shaft 22 which is directly or indirectly fixedly secured to transmission housing 10.

A connecting member 26 (that may be integral with yoke 14) extends from yoke 14 and is operatively connected to a clutch mechanism 28 to selectively clutchingly engage mainshaft gears 30 to the transmission mainshaft As can readily be seen in FIGS. 1 and 2, movement of block 6 by primary shaft 3 in one axial direction causes pivot arm 8 to pivot about pivot pin 100 and slide control yoke 14 in an opposite axial direction along control shaft 22 for effecting engagement of a selected mainshaft gear to the mainshaft 32 or vice versa when block 6 is moved in an opposite axial direction by shaft 3.

Pivot pin 100 has a cylindrical pivot surface 16 disposed intermediate an enlarged head 12 at one end and as transverse annual groove 18 adjacent its opposite end as shown in FIG. 2.

The length of pivot pin 100 between head 12 and groove 18 is adapted such that when received through aligned openings (not referenced) through housing 10 and pivot arm 8, head 12 abuts against one side of housing 10 and groove 18 is adjacent the opposite side of pivot arm 8 facing away from frame 10 such that pivot arm 8 is operative to rotate about cylindrical surface 16 and pivot arm 8 is held pivotable against frame 10 by a retaining ring such as snap ring referenced by numeral 20 in FIG. 2 that extends radially outwardly from groove 18.

Pivot pin 100 is made from a material having strength and wear properties commensurate with the requirement to provide a durable pivot pin for operating in a transmission environment.

What is claimed is:

1. An improved pivot pin for mounting a pivot arm of an X-control mechanism to a change gear transmission housing, said pivot arm engaged with an X-control block on one side of the pivot pin that is movable in opposite directions upon corresponding movement of a primary shaft selectively engageable there with, said pivot arm engaged with a X-control yoke on the opposite side of the pivot pin having one end operatively connected to a mainshaft gear clutching mechanism and an opposite end slidably movable along an X-control shaft that is in substantial parallel alignment with the primary shaft, said mechanism operative such that movement of the X-control block in one direction causes the pivot arm to pivot about the pivot pin and slide the X-control yoke in an opposite direction along the control shaft for effecting clutched engagement between the transmission mainshaft and the mainshaft gear by the clutching mechanism, and said improvement characterized by said pivot pin having a substantially cylindrical pivot surface disposed intermediate an enlarged head and an annular groove and operative to extend through aligned openings through the transmission housing and pivot arm with the pivot arm held in a pivotable condition against the transmission housing between the head of the pivot pin and a retaining ring extending radially outwardly from the groove.

2. An X-control mechanism for a change gear transmission having an improved pivot pin for mounting a pivot arm of the mechanism to a housing of the transmission, said pivot arm engaged with an X-control block on one side of the pivot pin that is movable in opposite directions upon corresponding movement of a primary shaft selectively engaged therewith, said pivot arm engaged with an X-control yoke on the opposite side of the pivot pin having one end operatively connected to a mainshaft gear clutching mechanism and an opposite end slidably movable along an X-control shaft that is in substantial parallel alignment with the primary shaft, said mechanism operative such that movement of the control block in one direction causes the actuator arm to pivot about the pivot pin and slide the X-control yoke in an opposite direction along the X-control shaft for effecting clutched engagement between the transmission mainshaft and the mainshaft gear by the clutching mechanism, and said improvement characterized by said pivot pin having a substantially cylindrical pivot surface disposed intermediate an enlarged head and an annular groove and extending through aligned openings through the transmission housing the pivot arm with the actuator pivot arm held in a pivotable condition against the transmission housing between the head of the pivot pin and a retaining ring extending radially outwardly from the groove.

3. The mechanism of claim 2 wherein the X-control block has an inner peripheral surface surrounding an opening therein and the primary shaft includes at least one protuberance extending radially outwardly therefrom and the X-control block is selectively engageable by the primary shaft upon rotation of the primary shaft to a rotational position predetermined to enable the protuberance to enter into a slot in the peripheral surface.

* * * * *